(12) United States Patent
Minov

(10) Patent No.: US 9,471,788 B2
(45) Date of Patent: Oct. 18, 2016

(54) EVALUATION OF SOFTWARE APPLICATIONS

(71) Applicant: Jasen Minov, Sofia (BG)

(72) Inventor: Jasen Minov, Sofia (BG)

(73) Assignee: SAP SE, WALLDORF (DE)

( * ) Notice: Subject to any disclaimer, the term of this patent is extended or adjusted under 35 U.S.C. 154(b) by 909 days.

(21) Appl. No.: 13/714,414

(22) Filed: Dec. 14, 2012

(65) Prior Publication Data

US 2014/0172404 A1    Jun. 19, 2014

(51) Int. Cl.
 *G06F 9/45* (2006.01)
 *G06F 21/57* (2013.01)
 *G06F 11/36* (2006.01)
 *G06F 9/455* (2006.01)

(52) U.S. Cl.
 CPC ............ *G06F 21/577* (2013.01); *G06F 9/455* (2013.01); *G06F 11/3672* (2013.01)

(58) Field of Classification Search
 None
 See application file for complete search history.

(56) References Cited

U.S. PATENT DOCUMENTS

| | | | | |
|---|---|---|---|---|
| 6,745,344 B1 * | 6/2004 | Joshi | .............. | G06F 11/3636 707/999.202 |
| 7,571,482 B2 * | 8/2009 | Polyakov | .............. | G06F 21/566 709/201 |
| 7,934,127 B2 * | 4/2011 | Kelso | .............. | G06F 11/3688 714/38.1 |
| 8,074,115 B2 * | 12/2011 | Stolfo | .............. | G06F 11/0718 714/38.1 |
| 8,136,095 B2 * | 3/2012 | Natanov | .............. | G06F 11/3684 717/101 |
| 8,352,431 B1 * | 1/2013 | Protopopov | ...... | G06F 17/30082 707/640 |
| 8,935,673 B1 * | 1/2015 | Ashkenazi | .......... | G06F 11/3636 702/186 |
| 2003/0046612 A1 * | 3/2003 | Grey | ......................... | H04L 1/24 714/38.1 |
| 2005/0038818 A1 * | 2/2005 | Hooks | .................. | G06F 11/0748 |
| 2005/0038827 A1 * | 2/2005 | Hooks | .................. | G06F 11/0748 |
| 2005/0044032 A1 * | 2/2005 | Lee | ......................... | G06Q 40/04 705/37 |
| 2005/0251860 A1 * | 11/2005 | Saurabh | .............. | H04L 63/1416 726/23 |
| 2006/0294592 A1 * | 12/2006 | Polyakov | .............. | G06F 21/566 726/24 |
| 2007/0240217 A1 * | 10/2007 | Tuvell | ..................... | G06F 21/56 726/24 |
| 2009/0133033 A1 * | 5/2009 | Lindo | ................. | G06F 11/0778 718/108 |
| 2010/0223499 A1 * | 9/2010 | Panigrahy | ........... | G06F 11/0709 714/19 |
| 2010/0281240 A1 * | 11/2010 | Brewis | ................ | G06F 11/3612 712/234 |
| 2011/0041179 A1 * | 2/2011 | St Hlberg | ............ | G06F 21/566 726/23 |
| 2011/0197097 A1 * | 8/2011 | Beaty | ...................... | H04L 41/16 714/27 |
| 2011/0219035 A1 * | 9/2011 | Korsunsky | ............. | G06F 17/30 707/784 |
| 2011/0265182 A1 * | 10/2011 | Peinado | ................ | G06F 21/554 726/24 |
| 2011/0321165 A1 * | 12/2011 | Capalik | .............. | G06F 11/3471 726/25 |
| 2013/0036403 A1 * | 2/2013 | Geist | ................... | G06F 11/3636 717/125 |
| 2013/0103972 A1 * | 4/2013 | Ozer | ................... | G06F 11/0727 714/2 |
| 2013/0305340 A1 * | 11/2013 | Wotring | ............. | H04L 63/1416 726/11 |

* cited by examiner

*Primary Examiner* — Saif Alhija
*Assistant Examiner* — Cuong Luu

(57) ABSTRACT

Software applications receive input data, perform processing of the received data and generate output. In one aspect the output is modification of data structures. The software application is tested with instances of input data that lead to various data modifications in the data structures. In another aspect, patterns are found in the modifications of the data structures, which are evaluated and analyzed for software vulnerabilities.

15 Claims, 8 Drawing Sheets

EVALUATION OF SOFTWARE APPLICATIONS

BACKGROUND

Enterprise software applications are typically complex and may consist of several abstraction layers and many different frameworks. An abstraction layer is a way of presenting a complex functionality by hiding implementations details. A software framework is another abstraction, which is a software platform used to develop applications. An advanced generation of software applications may utilize open source solutions with various levels of security. An open source solution is computer software that is available with source code. The source code and copyright are provided under a license that permits users to study, change, improve, and eventually distribute the software. However, often the security aspect is neglected, which causes unauthorized accesses or other performance problems such as error situations and application crashes. Tools for detecting potential security and performance vulnerabilities have become a crucial part in testing software applications.

Brute force algorithm is a general problem-solving technique, which includes identifying and systematically checking all possible candidates for solving a problem. Using a brute force algorithm to discover security and performance vulnerabilities of software applications is practically useless since the amount of time needed to analyze a software application it too much, even using the newest generation of computers. There is a need to apply some logic to analyze software application behavior in an optimized way.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques for evaluation of software applications are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Figure 1A:
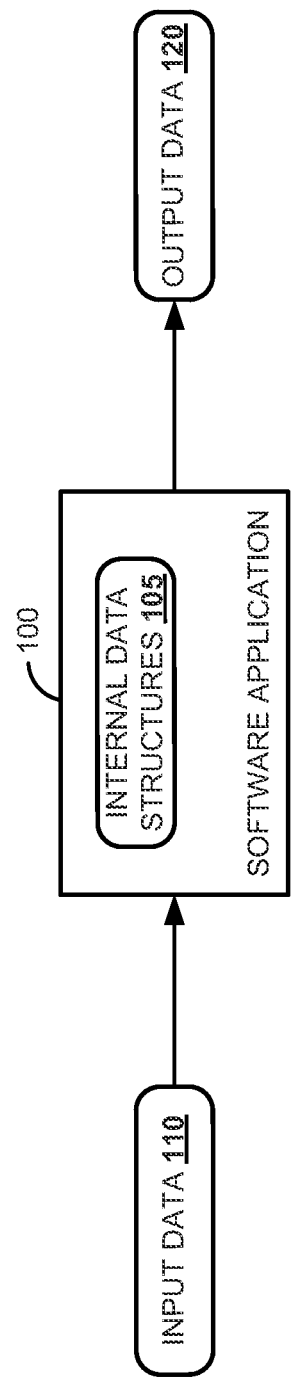
FIG. 1A is a block diagram illustrating a software application and its incoming and outgoing data flows.

A software application may be considered as a complex entity that has incoming and outgoing data flows. FIG. 1A represents such an application 100 with input data 110 and output data 120. The incoming data flow, which is input data 110, influences the internal state of the software application 100, while, at some point, the software application 100 generates an outgoing data flow, such as the output data 120. Thus, the process may be defined to include at least three major steps: receiving of incoming data, data processing, and generating outgoing data. During this process, the software application 100 may use some internal data structures 105 to store interim data. The content of the internal data structures 105 may depend on the input data 110 and software application logic. Data structures that are modified during the software application execution may be determined and then used to evaluate the software application steps using these data structures. The point where the execution of a request to the software application has reached (i.e., the breakpoint) together with variables (i.e., the data structures) that are changed during the software application execution define a program snapshot. A breakpoint identifies from an object and an instruction position within the bytecode of that object. Variables are mapped to data structures (e.g., a byte).

Figure 1B:
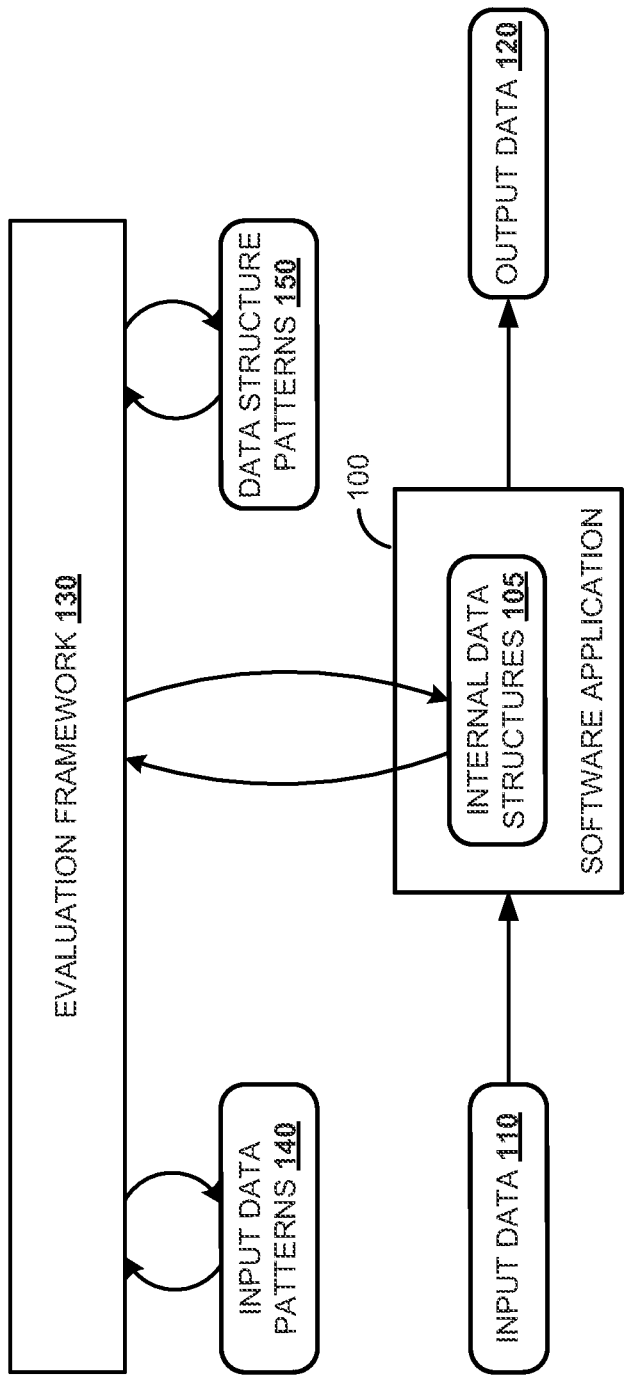
FIG. 1B is a block diagram illustrating an embodiment of an evaluation framework for a software application with its incoming and outgoing data flows.

Some of the data structures may be data wrappers. Data wrappers are thus mapped to an input pattern. Referring to FIG. 1B, by analyzing the changes within the internal data structures 105, it may be possible to define evaluation snapshots that direct the software application 100 to essentially different states. An evaluation snapshot is a program snapshot. Because there is a direct dependency between the input data 110 and the internal data structures 105, the derived evaluation snapshots for the internal data structures 105 may also be applied to the input data 110. The evaluation snapshots defined in this way may be linked with parent-child relationship and an ordered graph (tree) of evaluation snapshots can be built. The ordered graph may be expanded with additional patterns (e.g., both input patterns and resulting internal data structures patterns) that lead the software application 100 to different states. Some of these software application states may be of interest and by following a simple traverse algorithm applied to the tree such program, a software application state may be reached. If an evaluation framework, such as evaluation framework 130 is used to analyze the internal data structures 105 and create an evaluation snapshot tree for the software application 100, then data structure patterns 150, and input data patterns 140 may be identified. The input data patterns 140 are dependent on the data structure patterns 150. The identified data structure patterns 150 may be evaluated based on predefined rules that aim to discover critical scenarios for the software application 100.

Figure 2:
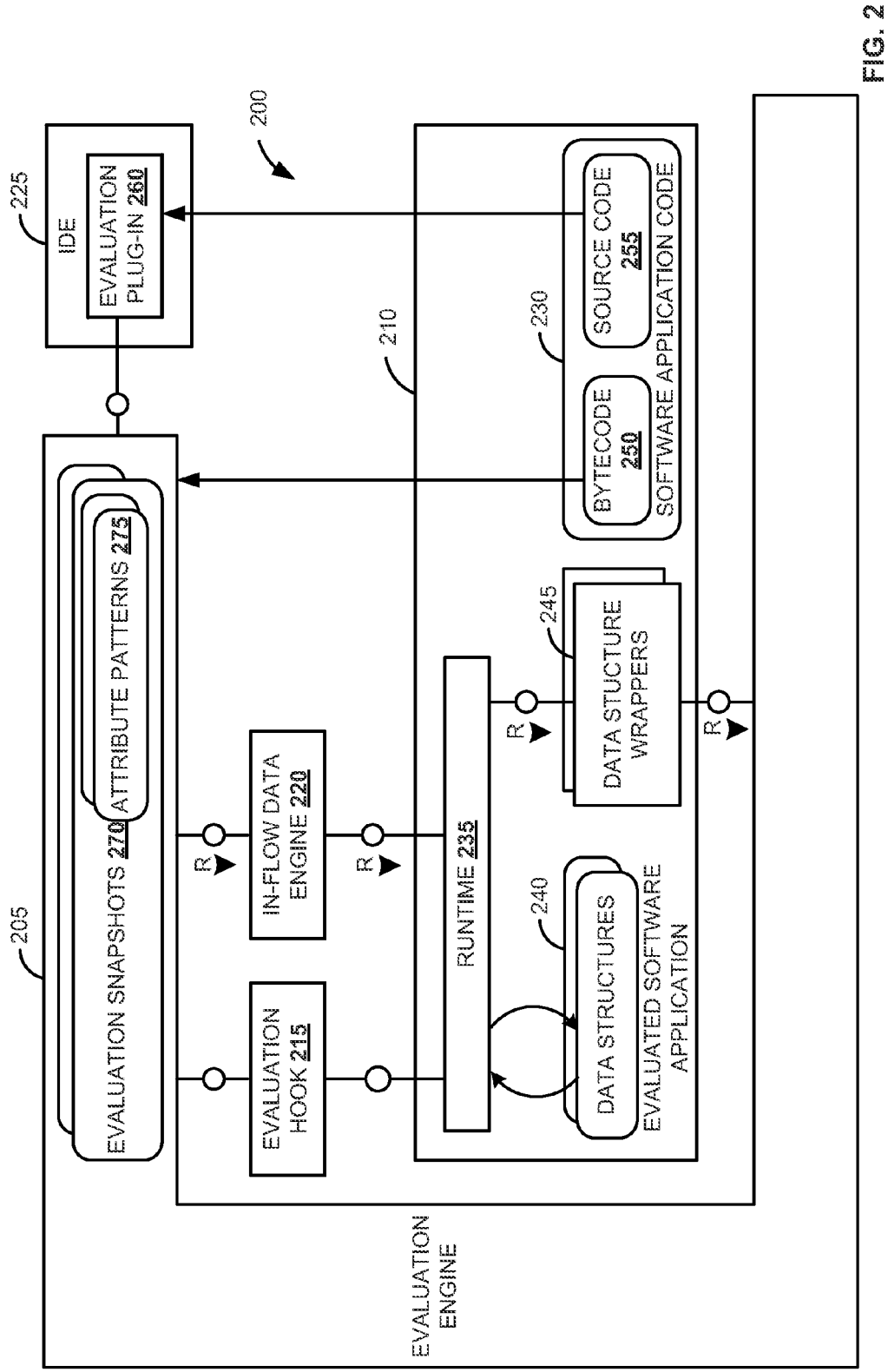
FIG. 2 is a block diagram illustrating an embodiment of a system for evaluation of software applications.

FIG. 2 is a block diagram illustrating an embodiment of a system 200 for evaluation of software applications. The system 200 includes an evaluation engine 205, evaluated software application 210, evaluation hook 215, an in-flow data engine 220, and an integrated development environment (IDE) 225.

Following the algorithm mentioned above for evaluation of a program in reference to FIGS. 1A and 1B, an oriented graph of evaluation snapshots for the software application 210 can be built. The edges of the graph may be executed software application steps and the nodes may be classified based on variables that are modified. The evaluation engine 205 includes evaluation snapshots 270 and controls an evaluation snapshots loop. The evaluation engine 205 also creates an evaluation snapshot graph. The modified variables may contain abstract data structures and when these data structures are accessed on some step, evaluation of some of the parent snapshots may be needed in order to determine the resulting snapshots.

The evaluation hook 215 is a module responsible for interacting with the evaluated software application 210. The evaluation hook 215 may also monitor the "one step" behavior of the evaluated software application 210 and could process steps in both directions. The evaluation hook 215 may also participate in building software application snapshots.

The evaluated software application 210 may include software application code 230, software application runtime 235, data structures 240, and data structure wrappers 245. The software application code 230 may include bytecode 250 and source code 255. The bytecode 250 may be used by the evaluation engine 205. The source code 255 may be used by the IDE 225 by means of an evaluation plug-in 260. In one embodiment, the source code 255 increases usability of the IDE 255, and a potential problem may be visualized in the source code 255. The software application runtime 235 may include all loaded classes and may communicate with the data structures 240 containing static and local variables. Data structure wrappers 245 may be used for data structures 240 that are mapped to patterns 275 in evaluation snapshots 270.

The in-flow data engine 220 may simulate input data for the evaluated software application 210. In one embodiment, the in-flow data engine 220 may generate test application examples based on an evaluation snapshot.

The IDE 225 and the evaluation plugin 260 may provide visual representation and management tools for the whole evaluation process.

Figure 3:
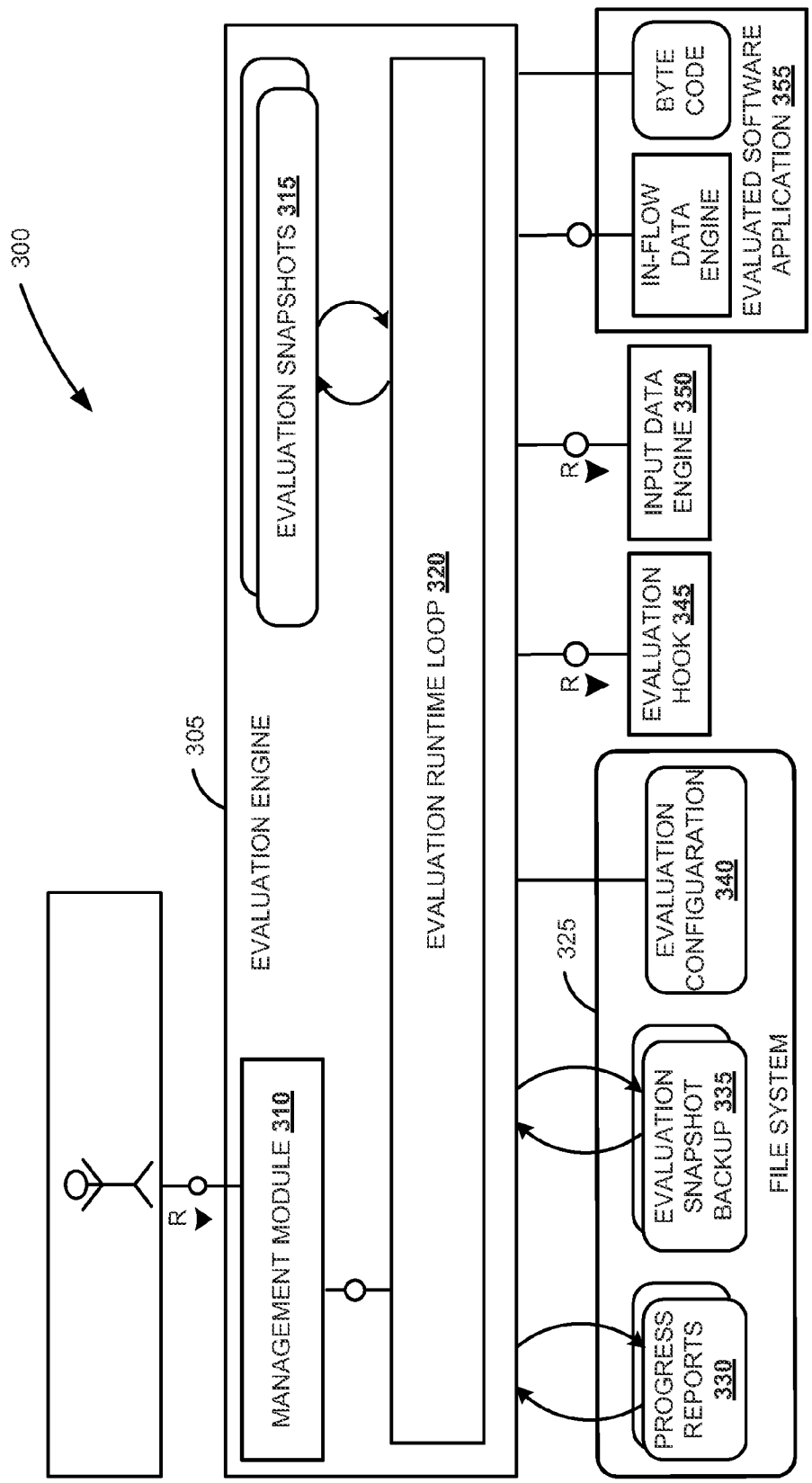
FIG. 3 is a block diagram illustrating an embodiment of an environment of an evaluation engine.

FIG. 3 is a block diagram illustrating an embodiment of an environment 300 of an evaluation engine 305. The evaluation engine 305 includes a management module 310, evaluation snapshots 315, and evaluation runtime loop 320. The evaluation engine 305 may evaluate an evaluated software application 355 by using an evaluation book 345 and an input data engine 350. The evaluation engine 305 may also use file system 325 to store and extract data necessary for the evaluation process.

The management module 310 may provide management activities such as suspend/resume against different instances of the evaluated software application 355. In one embodiment, the management module 310 is also operable to provide a visualization of the evaluation process.

The evaluation runtime loop 320 may create an evaluation snapshot graph from evaluation snapshots 315. The evaluation runtime loop 320, in connection with the evaluation hook 345, may be operable to monitor the behavior of the evaluated software application 355. The evaluation runtime loop 320, in communication with the input data engine 350, may be operable to simulate input data for the evaluated software application 355. The evaluation runtime loop 320 may use the file system 325 for performing backups of the evaluation snapshots 315, storing progress reports 330, and extracting configuration data such as evaluation configuration 340. In one embodiment, the progress reports 330 are human readable. In one embodiment, the evaluation configuration 340 includes configuration rules. In one embodiment, the configuration rules may define prioritization of the evaluation snapshots. In yet another embodiment, the configuration rules may define evaluation snapshots to be excluded from the evaluation runtime loop 320, which may be based on rules that define certain evaluation snapshots not being of interest for the evaluation process.

Figure 4:
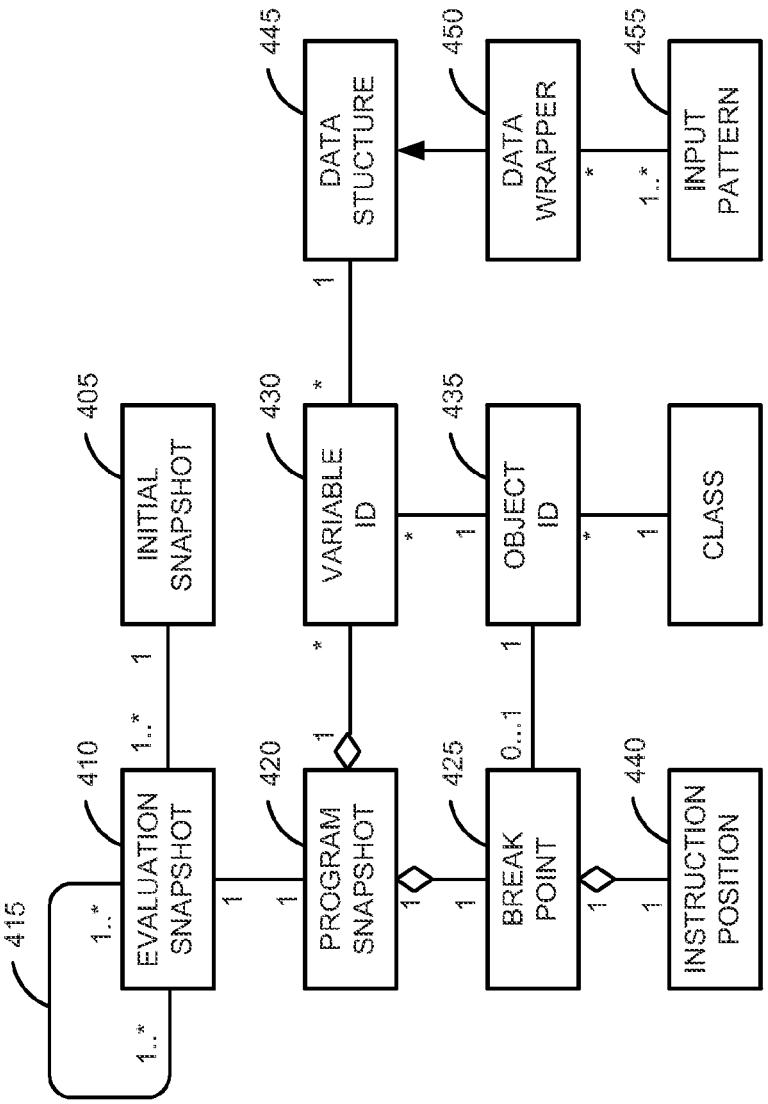
FIG. 4 is a class diagram illustrating an evaluation snapshot structure.

FIG. 4 is a class diagram illustrating an evaluation snapshot structure. An evaluation snapshot loop may starts from an initial evaluation snapshot 405. When evaluation snapshot 410 is added to the graph, the evaluation snapshot 410 has a parent association 415 to an existing evaluation snapshot. Evaluation snapshot 410 may contain a program snapshot 420. The program snapshot 420 may contain current breakpoint 425 and variables 430 changed during the software application execution. A breakpoint 425 identifies, from an object 435, and an instruction position 440 within the byte code of that object. A variable 430 may be mapped to data structure 445. Some of the data structures 445 may be data wrappers 450. Data wrappers 450 may be mapped to input patterns 455.

Figure 5:
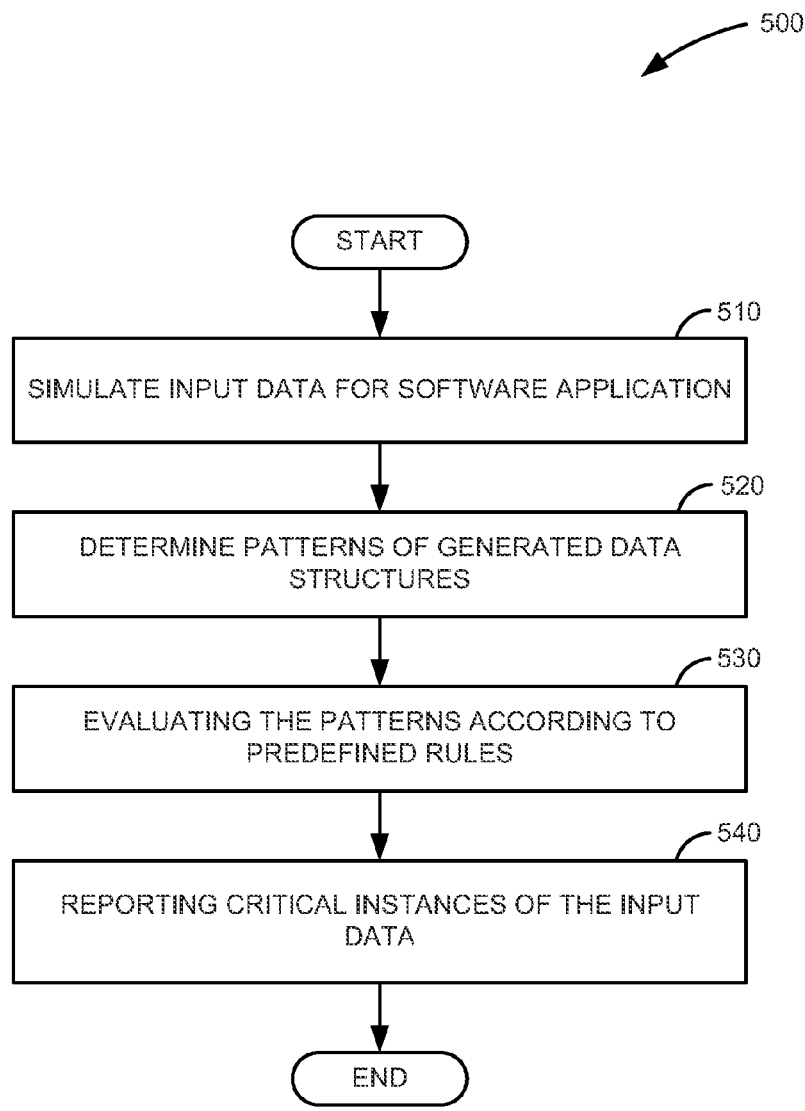
FIG. 5 is a flow diagram illustrating an embodiment of a method for evaluation of software applications.

FIG. 5 is a flow diagram illustrating an embodiment of a method 500 for evaluating of software applications. At block 510, input data is simulated for a software application. The software application may expect input data such as remote requests, application programming interface (API) calls, sent messages, etc. The input data may be input data 110 in FIG. 1A and FIG. 1B. In one embodiment, the simulated data is a contiguous data stream. The simulated input data is received by the software application such as software application 100 and the software application may generate some data structures according to the internal logic of the software application. The generated data structures may be data structures 105 and data structures 240.

At block 520, patterns of the generated data structures are determined. There may be a direct dependency between the generated data structures and the input data, and the patterns of the generated data structures may indicate these dependencies.

The input data for a software application may be a countable set. For example, the input data may be a sequence of bytes that go through one communication channel connected with the software application. In some embodiments, the input data may be more complex, but it remains a countable set and the same algorithm may be used. In one embodiment, the bytes from the input data are enumerated with the number of their position within the sequence: 1, 2, ... n. By having bytes: B1, B2, ..., Bn, for each such byte being a part from given input data, the following states S(Bn) may be defined:

not_needed: the byte Bn is still not processed from the software application;

free_data: the byte Bn is read by the software application, but there is still no branching based on its value, which means there is no data structure changed or program operations performed based on this data;

value_set: the byte Bn (or some sequence of bytes Bn ... Bn+m) has a predefined value set (e.g. [ab, ac, ad]) that directs the program to an exact branch; and strict_value: the same as the value set, but containing a single value. In one embodiment, an input state Sn may be defined as a union of all state of bytes that are part from the input: Sn=[S(B1), S(B2), . . . ]. An evaluation snapshot can be mapped to such input state. Similarly to the input data, a countable set from all attributes/variables within the evaluated software application may be built. Attributes/variables are all "places" where some data could be stored, for example, static variable of classes, thread locals, instances of loaded classes, attributes of these instances, local variables of called methods, etc. All attributes are given unique names, which may be done using one or more initial points and then mentioning all attributes as a reference according to this initial point (e.g., root classloader→all_classloders→app_classX→classXYZ→attributeABC). The attributes within a given snapshot could have the following states:

not_changed: attribute An has never been changed from the evaluation snapshot;

changed_with_constant: attribute An has been changed to a constant (the value of the constant does not contain the value of an input byte); here, a boundary case may be when the value depends on the count of processed input bytes.

changed_with_formula: attribute An has been changed to value of a computable formula that contains input bytes;

changed_with_value_set: a value set that contains a formula or constant values;

data_structure_wrapper: data structure wrappers may be used when there is a repeatable data structure pattern (e.g., within the input data with a defined list of data structures and no need to have different snapshots one for one data structure, another with list of two data structures, etc,); it is enough to have one snapshot with a data structure wrapper. There is also a need to detect such repeatable data structures during the execution of the software application.

Turning back to FIG. 5, at block 530, the determined patterns are evaluated based on predefined rules. In one embodiment, the patterns are checked for critical scenarios for the software application and critical instances of input data leading to the critical scenarios are defined. Critical scenarios for a software application include undesired situations and states of the executed software application. Undesired states may be error states, while undesired situation may be an unauthorized access to some data or resources. In one embodiment, the patterns are checked for possible system crashes and security faults.

At block 540, critical instances of input data causing critical errors in the software application may be reported.

Figure 6:
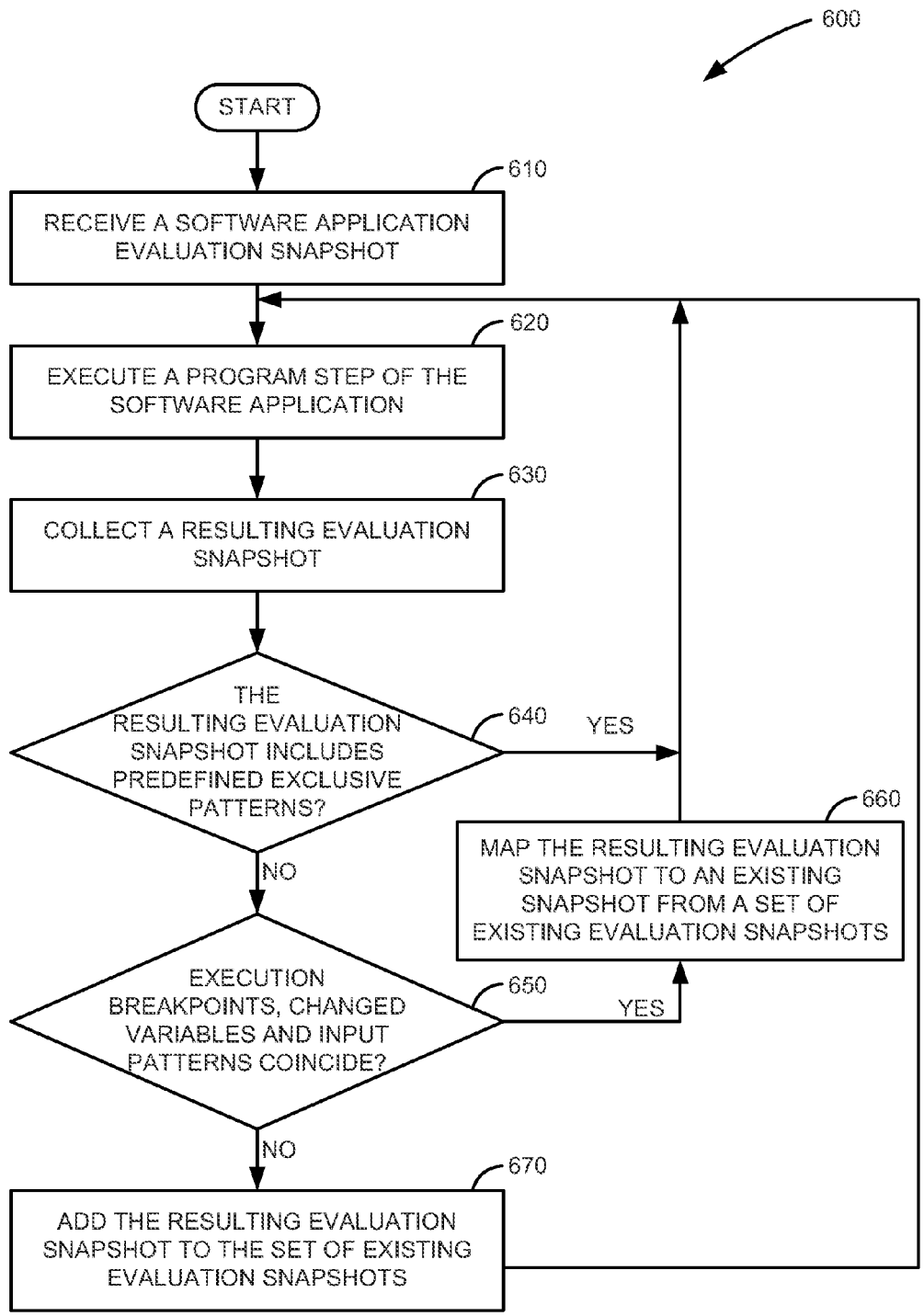
FIG. 6 is flow diagram illustrating an embodiment of a method for determining patterns in generated data structures for evaluation of software applications.

FIG. 6 is flow diagram illustrating an embodiment of a method 600 for determining patterns in generated data structures. At block 610, a software evaluation snapshot is received. The point where an execution of a request to a software application reached (execution breakpoint) together with all variables (data structures) that are changed during the software application execution define a snapshot. The evaluation snapshot 610 is an initial snapshot such as initial snapshot 405, from which an evaluation snapshot loop is started.

Then, at block 620, a program step of the software application is executed. Only program steps that modify some data structures or evaluate a data structure are of interest. These are operations that change value (e.g. x=1) and operations that branch based on a value (e.g. if x=0 { . . . }). At block 630, a resulting evaluation snapshot is collected. The resulting evaluation snapshot results from the executed program step at block 620.

At decision block 640, a check is performed to determine whether the resulting evaluation snapshot includes predefined exclusive patterns. The predefined exclusive patterns may be defined in configuration data such as evaluation configuration 340. If a predefined exclusive pattern is identified in the resulting evaluation snapshot, then the method returns to block 620 to execute another program step. If a predefined exclusive pattern is not found in the resulting evaluation snapshot, then the method continues to decision block 650 to perform another check. At decision block 650, the attributes, execution breakpoint, changed variables and input patterns of the resulting evaluation snapshot are checked to determine if they coincide with those of an existing snapshot from a set of existing evaluation snapshots. If these attributes do not coincide with those of an existing evaluation snapshot, then, at block 670, the resulting evaluation snapshot is added to the set of existing evaluation snapshots and the method returns to block 620 to execute another program step. If the attributes, execution breakpoint, changed variables and input patterns of the resulting evaluation snapshot do coincide with those of an existing evaluation snapshot, then the method continues to block 660 to map the resulting evaluation snapshot to the existing evaluation snapshot and the method returns to block 620 to execute another program step.

An example of a simple software application that receives as an input text and generates as an output a word that repeats most in the text follows. The software application caches the output in order to analyze the searches later. The software application code may be in Java as presented in Table 1:

TABLE 1

```
package example;
import java.io.BufferedReader;
import java.io.BufferedWriter;
import java.io.ByteArrayInputStream;
import java.io.IOException;
import java.io.InputStream;
import java.io.InputStreamReader;
import java.io.OutputStream;
import java.io.OutputStreamWriter;
import java.util.ArrayList;
import java.util.Hashtable;
import java.util.Iterator;
public class WordCounter {
    public static ArrayList<String> mostRepeatedWords = new
    ArrayList<String>( );
    public void mostRepeated(InputStream in, OutputStream out) throws
    IOException {
        BufferedReader reader = new BufferedReader(new
        InputStreamReader(in));
        String line = reader.readLine( );
        String[ ] words = line.split("\\W");
        Hashtable<String, Integer> wordCountTable = new
        Hashtable<String, Integer>( );
        for (String word : words) {
            Integer count = wordCountTable.get(word);
            if (count == null) {
                count = new Integer(1);
            } else {
                count = new Integer(count.intValue( ) + 1);
            }
                    wordCountTable.put(word, count);
        }
        reader.close( );
        String result = "";
        int count = 0;
        Iterator<String> wordIterator =
        wordCountTable.keySet( ).iterator( );
        while (wordIterator.hasNext( )) {
```

TABLE 1-continued

```
        String word = wordIterator.next( );
        int wordCount = wordCountTable.get(word).intValue( );
        if (wordCount > count) {
            result = word;
            count = wordCount;
        }
    }
    BufferedWriter writer = new BufferedWriter(new
    OutputStreamWriter(out));
    writer.write(result);
    writer.newLine( );
    writer.close( );
    mostRepeatedWords.add(result);
    }
}
```

The snapshot presented in Table 2 is generated at the end of its evaluation:

TABLE 2

```
SNAPSHOT: {
    OBJECT_INSTANCES: [
    { INSTANCE_NUMBER: 1
        TYPE: WordCounter.class
        LOCAL_VARIABLES: [
            { NAME: reader, TYPE: BufferedReader.class, ... };
            { NAME: line,
                TYPE: String;
                VALUE: { TYPE:
                RESTRICTED_INPUT_STREAM,
                    SIZE: UNRESTRICTED,
                    RESTRICTEDCHARSET: ['\n'];
                }
            }
            ...
        ]
    } ]
    STATIC_STRUCTURES: [
        { NAME: mostRepeatedWords
            TYPE: ArrayList.class
            VALUE: [
            { TYPE: String.class
                VALUE: { TYPE:
                RESTRICTED_INPUT_STREAM,
                    SIZE: UNRESTRICTED,
                    RESTRICTEDCHARSET: ['\n', ' ']
                }
            } ]
        }
    ]
    OUTPUT: { ... }
    ...
}
```

Other snapshots are also generated but they are not of interest for the checks performed below. There may be a predefined set of rules (checks) that are executed against that snapshot. Two possible checks may be:

Check 1: If OBJECT_INSTANCES contain some VARIABLE with VALUE having UNRESTRICTED SIZE, then this is an indicator for possible out-of-memory problem. This rule may be used to discover a situation when there is no limitation for buffering the data coming from the input data stream within the memory. In that situation, a variable with unrestricted size is sought.

In the example above: the check discovers variable "line", Then, any lone: enough input data stream that does not contain '\n' causes an out-of-memory problem for the software application (see restrictions on variable's value).

Check 2: If STATIC_STRUCTURES contain some VALUE from type RESTRICTED_INPUT_STREAM that is an indicator for possible out-of-memory problem.

This rule may be used to discover a situation when data coming from the input data stream is stored within the memory in static objects. This situation could lead to an out-of-memory problem as the incoming data request could be repeated many times and, each time, the memory used by the program increases.

In the example above: the check discovers variable "mostRepeatedWords". Then, any call to the software application causes an increase of the used memory. After multiple calls, the out-of-memory problem appears.

Some embodiments may include the above-described methods being, written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is located remotely from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 7:
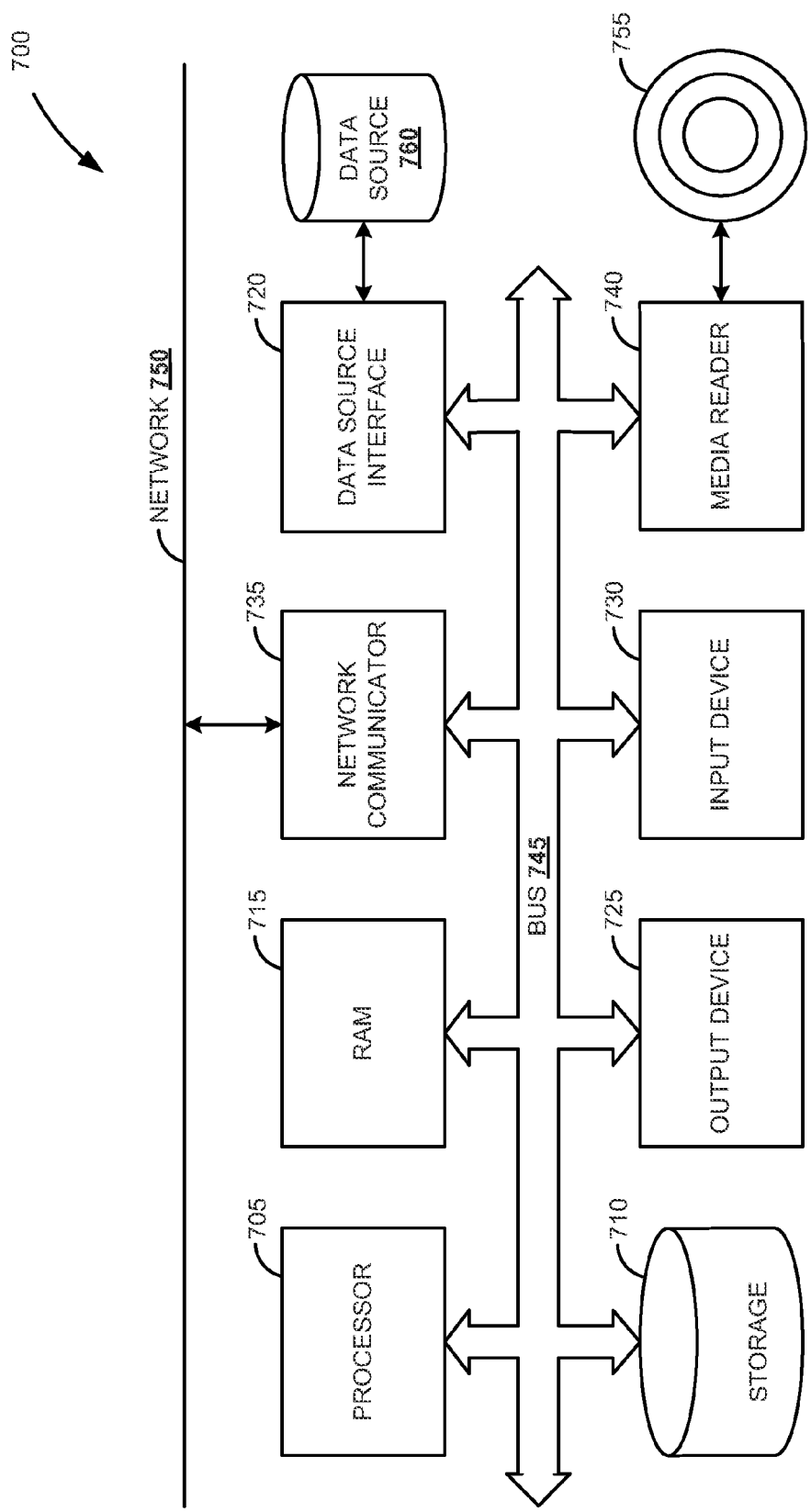
FIG. 7 is a block diagram illustrating an embodiment of a computing environment in which the techniques described for evaluation of software applications can be implemented.

FIG. 7 is a block diagram of an exemplary computer system 700. The computer system 700 includes a processor 705 that executes software instructions or code stored on a computer readable storage medium 755 to perform the above-illustrated methods. The computer system 700 includes a media reader 740 to read the instructions from the computer readable storage medium 755 and store the instructions in storage 710 or in random access memory (RAM) 715. The storage 710 provides a large space for keeping static data where at least some instructions could be stored for later execution. The stored instructions may be further compiled to generate other representations of the instructions and dynamically stored in the RAM 715. The processor 705 reads instructions from the RAM 715 and performs actions as instructed. According to one embodiment, the computer system 700 further includes an output device 725 (e.g., a display) to provide at least some of the results of the execution as output including, but not limited to, visual information to users and an input device 730 to provide a user or another device with means for entering data and/or otherwise interact with the computer system 700. Each of these output devices 725 and input devices 730 could be joined by one or more additional peripherals to further expand the capabilities of the computer system 700. A network communicator 735 may be provided to connect the computer system 700 to a network 750 and in turn to other devices connected to the network 750 including other clients, servers, data stores, and interfaces, for instance. The modules of the computer system 700 are interconnected via a bus 745. Computer system 700 includes a data source interface 720 to access data source 760. The data source 760 can be accessed via one or more abstraction layers implemented in hardware or software. For example, the data source 760 may be accessed by network 750. In some embodiments the data source 760 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. in other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method for evaluation of a software application comprising:
   simulating input data for the software application;
   generating data structures from the input data based on application logic of the software application, wherein evaluation snapshots for the software application are derived for the generated data structures;
   determining patterns of the generated data structures in the evaluation snapshots, the patterns indicating dependencies between the generated data structures and the input data, wherein determining the patterns further comprises:
   determining a graph including a set of the evaluation snapshots that do not coincide with one another;
   receiving a software application evaluation snapshot;
   executing a program step of the software application;
   collecting a resulting evaluation snapshot from the execution of the program step;
   mapping the resulting evaluation snapshot to an existing snapshot from the set of the evaluation snapshots to determine whether an execution breakpoint, changed variable, and input patterns of the input data related to the resulting evaluation snapshot coincide with an execution breakpoint, changed variable, and input patterns of input data related to the existing snapshot from the set of the evaluation snapshots; and
   adding the resulting evaluation snapshot to the set of the evaluation snapshots when the resulting evaluation snapshot does not coincide with the existing snapshot from the set of evaluation snapshots; and
   evaluating the patterns based on predefined rules.

2. The method of claim 1, further comprising reporting critical instances of the input data based on the evaluation of the patterns.

3. The method of claim 1, wherein determining the patterns of the generated data structures further comprises excluding the resulting evaluation snapshot from the set of the evaluation snapshots when the resulting evaluation snapshot comprises predefined exclusive patterns.

4. The method of claim 1, wherein evaluating the patterns based on the predefined rules comprises:
   checking the patterns for critical scenarios for the software application; and
   defining critical instances of the input data for the critical scenarios.

5. The method of claim 4, wherein checking the patterns for the critical scenarios comprises:
   checking for system crashes; and
   checking for security faults.

6. A computer system for evaluation of a software application comprising:
a processor; and
a memory in communication with the processor, the memory storing instructions related to:
an in-flow data engine to simulate input data for the software application, the input data generating data structures in the memory based on application logic of the software application, wherein evaluation snapshots for the software application are derived for the generated data structures; and
an evaluation engine to:
determine patterns of the generated data structures in the evaluation snapshots, the patterns indicating dependencies between the data structures and the input data, wherein determining the patterns further comprises:
determining a graph including a set of the evaluation snapshots that do not coincide with one another;
receiving a software application evaluation snapshot;
executing a program step of the software application;
collecting a resulting evaluation snapshot from the execution of the program step;
mapping the resulting evaluation snapshot to an existing snapshot from the set of the evaluation snapshots to determine whether an execution breakpoint, changed variable, and input patterns of the input data related to the resulting evaluation snapshot coincide with an execution breakpoint, changed variable, and input patterns of input data related to the existing snapshot from the set of the evaluation snapshots; and
adding the resulting evaluation snapshot to the set of the evaluation snapshots when the resulting evaluation snapshot does not coincide with the existing snapshot from the set of evaluation snapshots; and
evaluate the patterns based on predefined rules.

7. The system of claim 6, wherein the evaluation engine is further operable to:
report critical instances of the input data based on the evaluation of the patterns.

8. The system of claim 6, wherein the evaluation engine is operable to exclude the resulting evaluation snapshot from the set of the evaluation snapshots when the resulting evaluation snapshot comprises predefined exclusive patterns.

9. The system of claim 6, wherein the evaluation engine is further operable to:
check the patterns for critical scenarios for the software application; and
define the critical instances of the input data for the critical scenarios.

10. The system of claim 9, wherein the evaluation engine is further operable to:
check for system crashes; and
check for security faults.

11. An article of manufacture including a non-transitory computer readable storage medium to tangibly store instructions, which when executed by a computer, cause the computer to:
simulate input data for the software application;
generate data structures from the input data based on application logic of the software application, wherein evaluation snapshots for the software application are derived for the generated data structures;
determine patterns of the generated data structures in the evaluation snapshots, the patterns indicating dependencies between the data structures and the input data, wherein determining the patterns further comprises:
determining a graph including a set of the evaluation snapshots that do not coincide with one another;
receiving a software application evaluation snapshot;
executing a program step of the software application;
collecting a resulting evaluation snapshot from the execution of the program step;
mapping the resulting evaluation snapshot to an existing snapshot from the set of the evaluation snapshots to determine whether an execution breakpoint, changed variable, and input patterns of the input data related to the resulting evaluation snapshot coincide with an execution breakpoint, changed variable, and input patterns of input data related to the existing snapshot from the set of the evaluation snapshots; and
adding the resulting evaluation snapshot to the set of the evaluation snapshots when the resulting evaluation snapshot does not coincide with the existing snapshot from the set of evaluation snapshots; and
evaluate the patterns based on predefined rules.

12. The article of manufacture of claim 11, further storing instructions, which when executed by a computer, cause the computer to report critical instances of the input data based on the evaluation of the patterns.

13. The article of manufacture of claim 11, wherein the instructions to determine the patterns of the generated data structures further comprise instructions, which when executed by a computer, cause the computer to exclude the resulting evaluation snapshot from the set of the evaluation snapshots when the resulting evaluation snapshot comprises predefined exclusive patterns.

14. The article of manufacture of claim 11, wherein the instructions to evaluate the patterns based on the predefined rules further comprise instructions, which when executed by a computer, cause the computer to:
check the patterns for critical scenarios for the software application; and
define critical instances of the input data for the critical scenarios.

15. The article of manufacture of claim 14, wherein the instructions to check the patterns for the critical scenarios further comprise instructions, which when executed by a computer, cause the computer to:
check for system crashes; and
check for security faults.

* * * * *